UNITED STATES PATENT OFFICE.

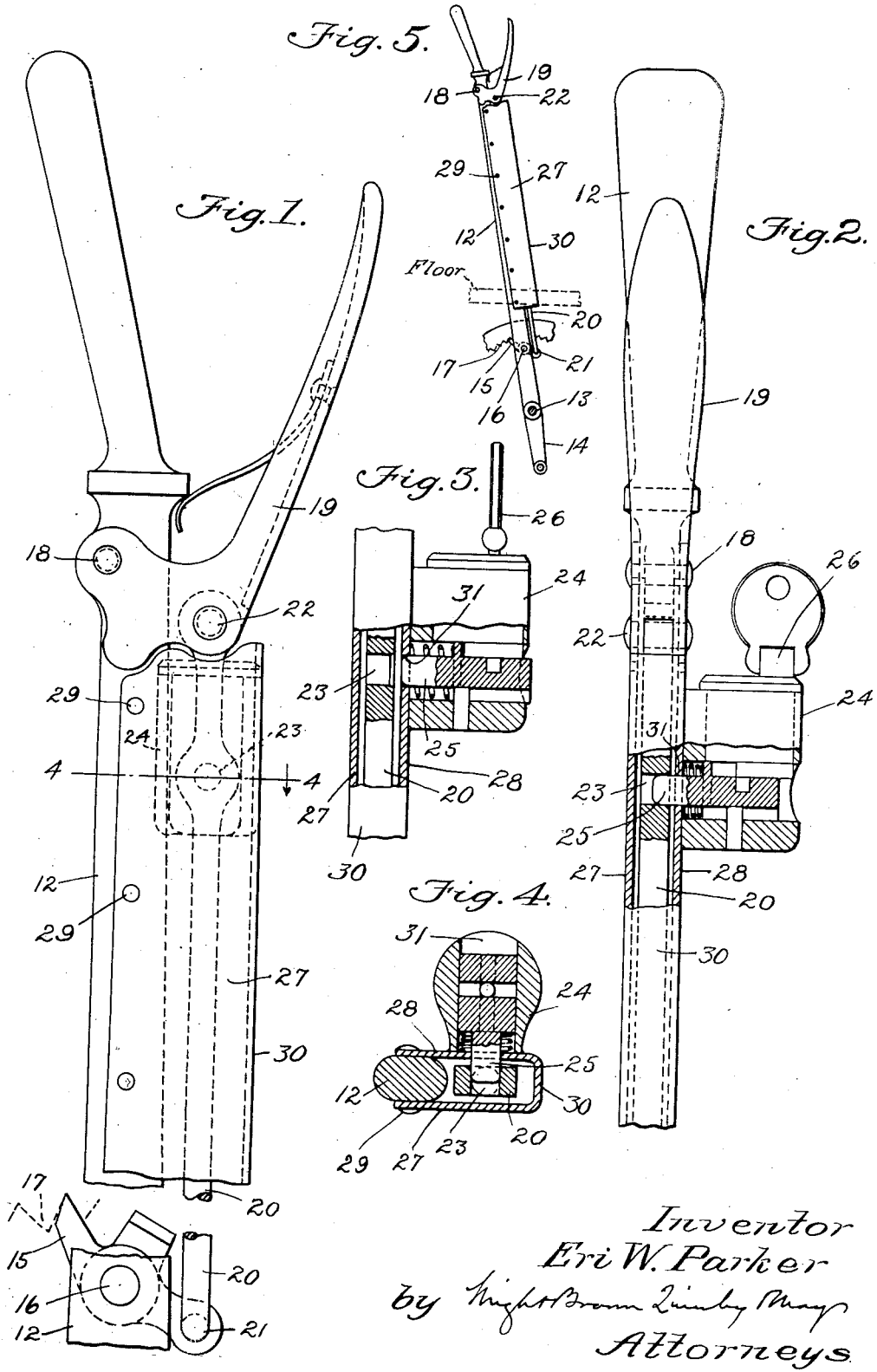

ERI W. PARKER, OF MALDEN, MASSACHUSETTS.

SAFETY LOCKING DEVICE.

1,310,577.   Specification of Letters Patent.   Patented July 22, 1919.

Application filed April 11, 1919. Serial No. 289,292.

*To all whom it may concern:*

Be it known that I, ERI W. PARKER, a citizen of the United States, residing at Malden, in the county of Middlesex and State of Massachusetts, have invented new and useful Improvements in Safety Locking Devices, of which the following is a specification.

This invention relates to means for locking a lever against movement, and particularly a brake lever pertaining to a motor vehicle, the object of locking the lever being to prevent unauthorized operation of the vehicle.

The invention is embodied in the improvements which I will now proceed to describe and claim.

Of the accompanying drawings forming a part of this specification,—

Figure 1 is a side elevation of a portion of a brake lever embodying the invention.

Fig. 2 is an elevation of the same, looking from the right in Fig. 1, portions being shown in section, and the lock bolt hereinafter described being projected.

Fig. 3 is a view similar to a portion of Fig. 2, showing the lock bolt retracted.

Fig. 4 is a section on line 4—4 of Fig. 1.

Fig. 5 is a side elevation on a reduced scale, showing the entire lever.

The same reference characters indicate the same parts in all of the figures.

In the drawings, 12 represents a lever which, as here shown, is the emergency brake lever of a motor vehicle of the Ford type. It will be understood, however, that my invention is not limited to vehicles of this type.

The fulcrum point of the lever is shown at 13 (Fig. 5), and the lever is provided with an arm 14 projecting below the fulcrum for engagement with brake mechanism not shown.

15 represents a movable locking dog, which, as here shown, is pivoted at 16 to the lever at a point between its fulcrum and its outer end, said dog being adapted to engage either of a plurality of teeth 17 on a fixed bar.

On the outer end portion of the lever 12 is fulcrumed at 18 a handle member 19.

20 is an elongated rod extending substantially parallel with the lever 12, its inner end being pivoted at 21 to the dog 15, and its outer end at 22 to the handle member 19.

The structure thus far described is common and well known, so that its mode of operation will not require more detailed description.

In carrying out my invention, I provide the rod 20 at a point near its outer end with a bolt-receiving socket 23, and connect with the lever 12 a lock which includes a casing 24, fixed relative to the lever, and offset therefrom, and a bolt 25 arranged to be projected from the casing into the socket 23 to lock the rod 20 against endwise movement, the lock being provided with any suitable mechanism, including a key 26, for projecting and retracting the bolt. The arrangement is such that when the dog 15 is engaged with a tooth 17, the socket 23 is in position to receive the bolt 25, so that the projection of the bolt locks the dog through the medium of the rod 20.

While the lock casing 24 may be attached to the lever 12 in any suitable way, I prefer, for reasons which will hereinafter appear, to rigidly connect the lock casing with the lever by means of a guard, which is rigidly secured to the lever and the lock casing, and holds the latter suitably offset from the lever to permit the engagement of the bolt 25 with the socket 23. The form and arrangement of the guard are such that access to all portions of the guard, which would otherwise be permitted, between the handle member 19 and the portion of the lever which extends through the floor of the vehicle, is prevented, so that the rod cannot be severed, or rendered inoperative, by a person intending to steal the vehicle.

The guard is preferably formed by bending an elongated strip of sheet or plate metal of suitable thickness, into the form of a sheath which includes two side portions 27 and 28, bearing on opposite sides of the lever 12, and attached thereto by rivets 29, or otherwise, and a neck 30 connecting said side portions, and spaced by the latter from the lever. The lock casing 24 is rigidly attached, by brazing, welding, or otherwise, to the side portion 28 of the guard, said side portion 28 being provided with an orifice 31 in which the bolt 25 is movable.

As shown by Fig. 1, the upper end of the guard is shaped to conform to a portion of the handle member 19, so that only a narrow crevice exists between the guard and the handle member, said crevice being too narrow to permit the application of a cutting tool to the portion of the rod 20 between the handle member and the guard.

When the bolt 25 is projected into the socket 23, the dog 18 is locked in engagement with a tooth 17, so that the vehicle cannot be operated until the bolt is retracted by a suitable key.

The guard constitutes a holder for the lock casing 24, and holds the casing offset from one side of the lever 12, so that the lock bolt is adapted to enter the socket 23 in the rod 20, said rod being spaced from the same side of the lever. The said holder, the lock casing attached thereto, and the lock holder includes a portion bearing on and attached to the lever and a portion projecting from the lever, the lock casing being attached to said projecting portion. The bolt, constitutes an attachment readily applicable to a lever of the type shown, in position to enable the lock bolt to enter a socket in a rod which is spaced from one side of the lever. The lever, the rod and the dog, constitute a well known brake-operating and locking means, which is converted by said attachment into a safety device without change or adaptation, other than the substitution for the usual rod, of a rod having the bolt-receiving socket 23. The extension of said holder from the lock casing, as shown, and its sheath form, enable the holder to perform the function of preventing access to the rod.

I claim:

1. A safety locking device of the character stated, comprising a lever, a locking dog pivoted to the inner end portion of the lever and adapted to engage a toothed bar, a handle member fulcrumed on the outer end portion of the lever and projecting from one side thereof, a rod connecting said dog and handle member, and provided between its ends with a bolt-receiving socket, said rod extending lengthwise of the lever and at one side thereof, and a safety attachment including a lock holder having a portion bearing on and attached to the lever, and a portion projecting laterally from the lever beside said rod, a lock casing attached to the projecting portion of said holder, and a bolt movable in said casing in position to enter the rod socket.

2. A safety locking device of the character stated, comprising a lever provided with a movable locking dog adapted to engage a fixed toothed bar, a handle member fulcrumed on the lever, a rod extending substantially parallel with the lever and pivoted at one end to the dog, and at the other end to the handle member, said rod being provided with a socket near its outer end, a guard formed as a sheath attached to the lever and preventing access to the rod, and a lock including a casing attached to the guard and offset thereby from the lever, and a bolt arranged to be projected from the casing into said socket to confine the rod against endwise movement, the outer end of said guard conforming to a portion of the handle member, and preventing access to the portion of the rod between the handle member and the guard.

3. A safety locking device of the character stated, comprising a lever having a movable locking dog, a handle member movably connected with the outer end portion of the lever, a rod connected at one end with the dog, and at the other end with said handle member, and provided with a bolt-receiving socket, an elongated guard including two side portions attached to the lever at opposite sides thereof, and a neck connecting said side portions and spaced thereby from the lever, said guard constituting a sheath preventing access to the rod, and a lock including a casing attached to said guard, and a bolt adapted to be projected from said casing, and to enter said guard and socket to prevent endwise movement of the rod.

In testimony whereof I have affixed my signature.

ERI W. PARKER.